United States Patent
Damie et al.

(12)

(10) Patent No.: US 6,301,864 B1
(45) Date of Patent: Oct. 16, 2001

(54) INTERLOCK FOR LAWNMOWER (75) Inventors: Joseph J. Damie, Menasha; Timothy J. Peter, Appleton; Paul A. Schroeder, Manitowoc, all of WI (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 09/619,995

(22) Filed: Jul. 20, 2000

Related U.S. Application Data (60) Provisional application No. 60/145,132, filed on Jul. 22, 1999.

(51) Int. Cl.[7] .................................................. A01D 34/00
(52) U.S. Cl. ................................................................ 56/11.3
(58) Field of Search ..................................... 56/10.1, 10.5, 56/10.6, 10.8, 11.1, 11.3, 11.4, 11.7, 16.7; 180/305, 307, 318, 338

(56) References Cited

U.S. PATENT DOCUMENTS

| | | | |
|---|---|---|---|
| 3,766,722 | * 10/1973 | Kamlukin et al. ..................... | 56/11.6 |
| 4,310,082 | * 1/1982 | Elmy et al. ............................. | 192/11 |
| 5,335,487 | * 8/1994 | Murakawa et al. ................... | 56/10.5 |
| 6,092,617 | * 7/2000 | White, III et al. .................... | 180/338 |

* cited by examiner

Primary Examiner—Robert E. Pezzuto
(74) Attorney, Agent, or Firm—Michael Best & Friedrich LLP (57) ABSTRACT

A riding lawnmower includes a parking brake handle movable between an engaged position and a disengaged position. When the parking brake handle is in the disengaged position, the lawnmower control levers are permitted to operate the lawnmower drive system, and the lawnmower engine startup circuit is in an open condition in which the engine is unable to be started. When the parking brake handle is in the engaged position, the lawnmower wheels are substantially prevented from rotating, the control levers are locked in a neutral position, and the startup circuit is in a closed condition in which the engine is able to be started. Movement of the parking brake handle to the engaged position causes the control levers to move to the neutral position.

15 Claims, 8 Drawing Sheets

INTERLOCK FOR LAWNMOWER

This application claims the benefit of U.S. Provisional Patent Application No. 60/145,132 filed Jul. 22, 1999.

FIELD OF THE INVENTION

This invention relates to lawnmowers and, more specifically, to zero turn lawnmowers and a mechanical brake interlock for such mowers.

BACKGROUND OF THE INVENTION

Interlock systems for lawnmowers and specifically zero turn lawnmowers have been used in the past. Such prior arrangements have generally been electrically actuated, and have been expensive and yet not totally reliable.

SUMMARY OF THE INVENTION

The present invention provides a lawnmower having a chassis, an engine mounted to the chassis, a rotary cutting blade selectively rotated by the engine, and first and second drive wheels at least partially supporting the chassis and rotatable to cause movement of the chassis. A drive system is provided for each drive wheel and includes a control lever controlling the direction and speed of rotation of the drive wheel and having a neutral position where the drive wheel is not driven by the drive system. The lawnmower also includes a parking brake interconnected with the chassis and movable between an engaged position and a disengaged position to lock and unlock, respectively, the drive wheels.

The lawnmower may further include a brake sensor determining when the parking brake is in the engaged position, and a starting device for starting the engine. The brake sensor is a part of the starting circuit for the engine, and prevents the engine from starting when the parking brake is not in the engaged position. The starting device does not use sensors separate from the brake sensor to determine whether the control levers are in their neutral positions. Preferably, the brake sensor includes a switch in the form of a plunger.

The lawnmower may also include a linkage interconnecting the parking brake with the control levers. The linkage is moved into a non-interference position in response to the parking brake being disengaged, and is moved into an interference position in response to the parking brake being engaged. In the non-interference position, the linkage permits movement of the control levers from the neutral positions, and in the engaged position, the linkage resists movement of the control levers from the neutral positions.

Preferably, the lawnmower includes a biasing member biasing the linkage toward the interference position. The linkage preferably includes first and second interlock arms movable to hold the first and second control levers, respectively, in their respective neutral positions when the linkage is in the interference position. The interlock arms include ramped guide surfaces to guide the control levers to their respective neutral positions.

The linkage also may include a yoke mounted to the chassis for rotation with respect to the chassis. The interlock arms are fixed for rotation with the yoke, and the biasing member is interconnected with the yoke. The yoke includes a slot having at least one substantially closed end. The linkage preferably includes a finger extending into and movable along the slot to abut the closed end of the slot and move the interlock arms to the non-interference position against the biasing force of the biasing member. The finger disengages the closed end of the slot in response to the parking brake being moved toward the disengaged position.

The lawnmower may also include an over-center mechanism urging the parking brake toward the engaged position when it is in the engaged position, and toward the disengaged position when it is in the disengaged position. The over-center mechanism may also urge the yoke and interlock arms toward the non-interference position when they are in the non-interference position.

DESCRIPTION OF THE PREFERRED EMBODIMENT

Figure 1:
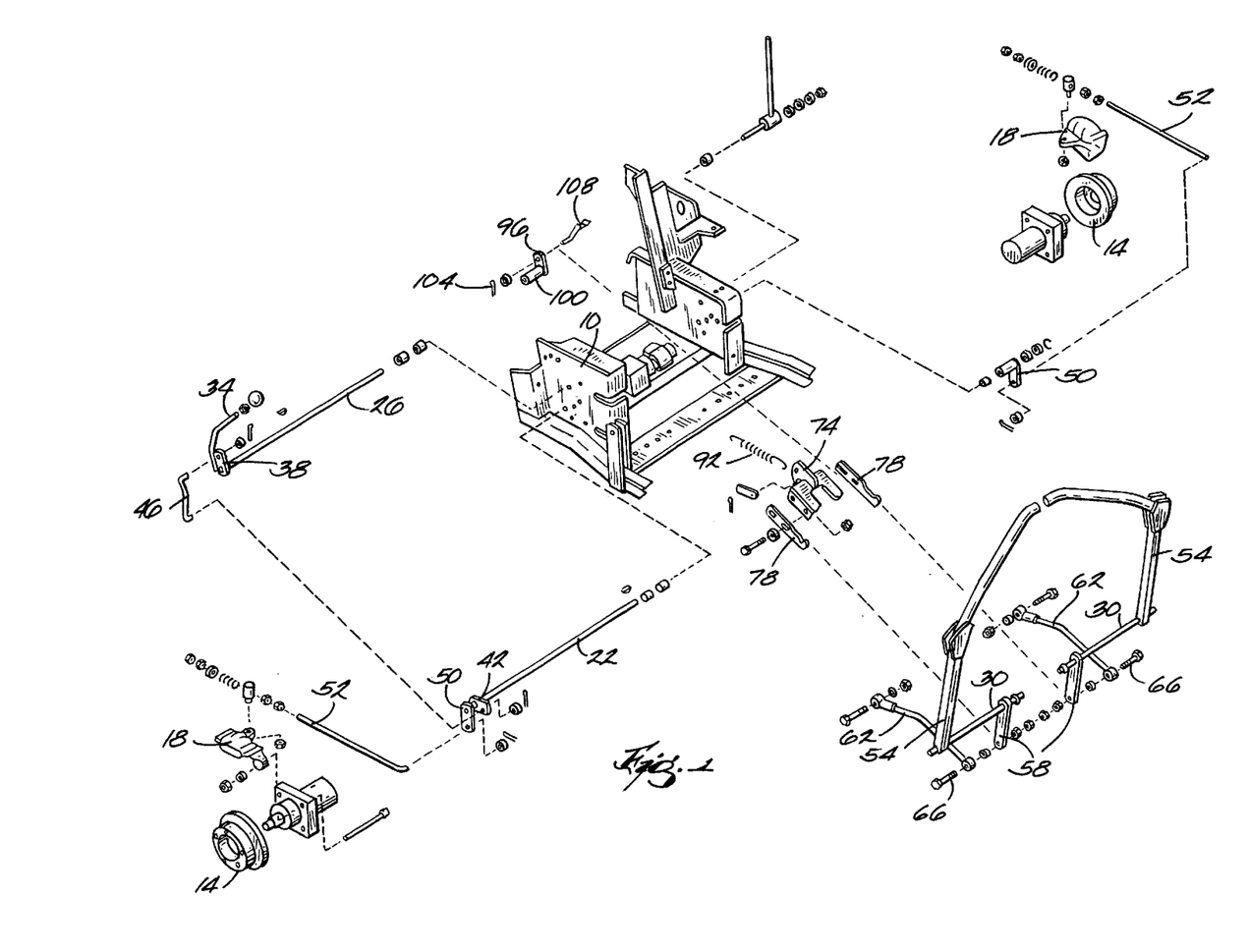
FIG. 1 is an exploded illustration of a portion of a lawnmower including a parking brake and drive assembly embodying the invention.
Figure 2:
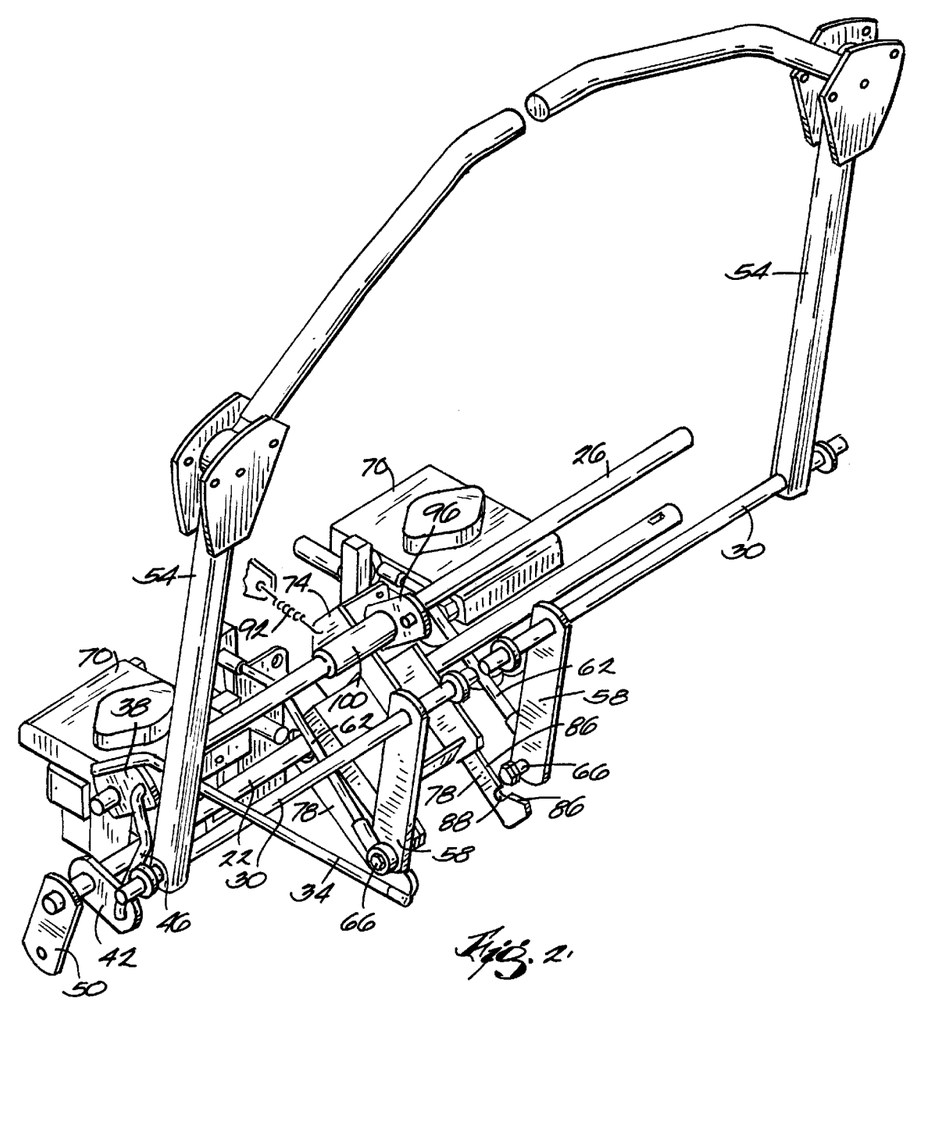
FIG. 2 is a front right perspective view of the assembly with the parking brake disengaged.
Figure 3:
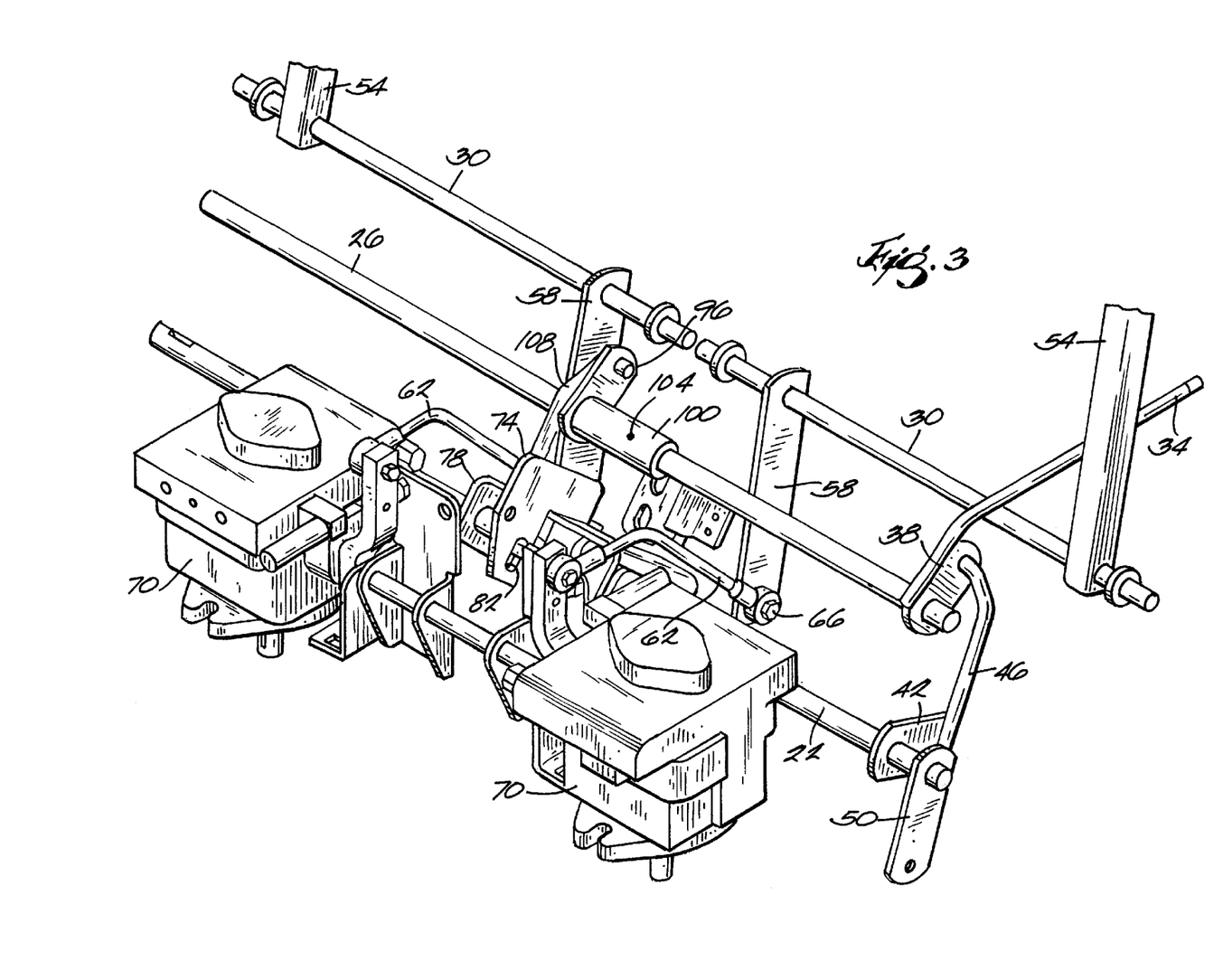
FIG. 3 is a rear right perspective view of the assembly with the parking brake disengaged.
Figure 4:
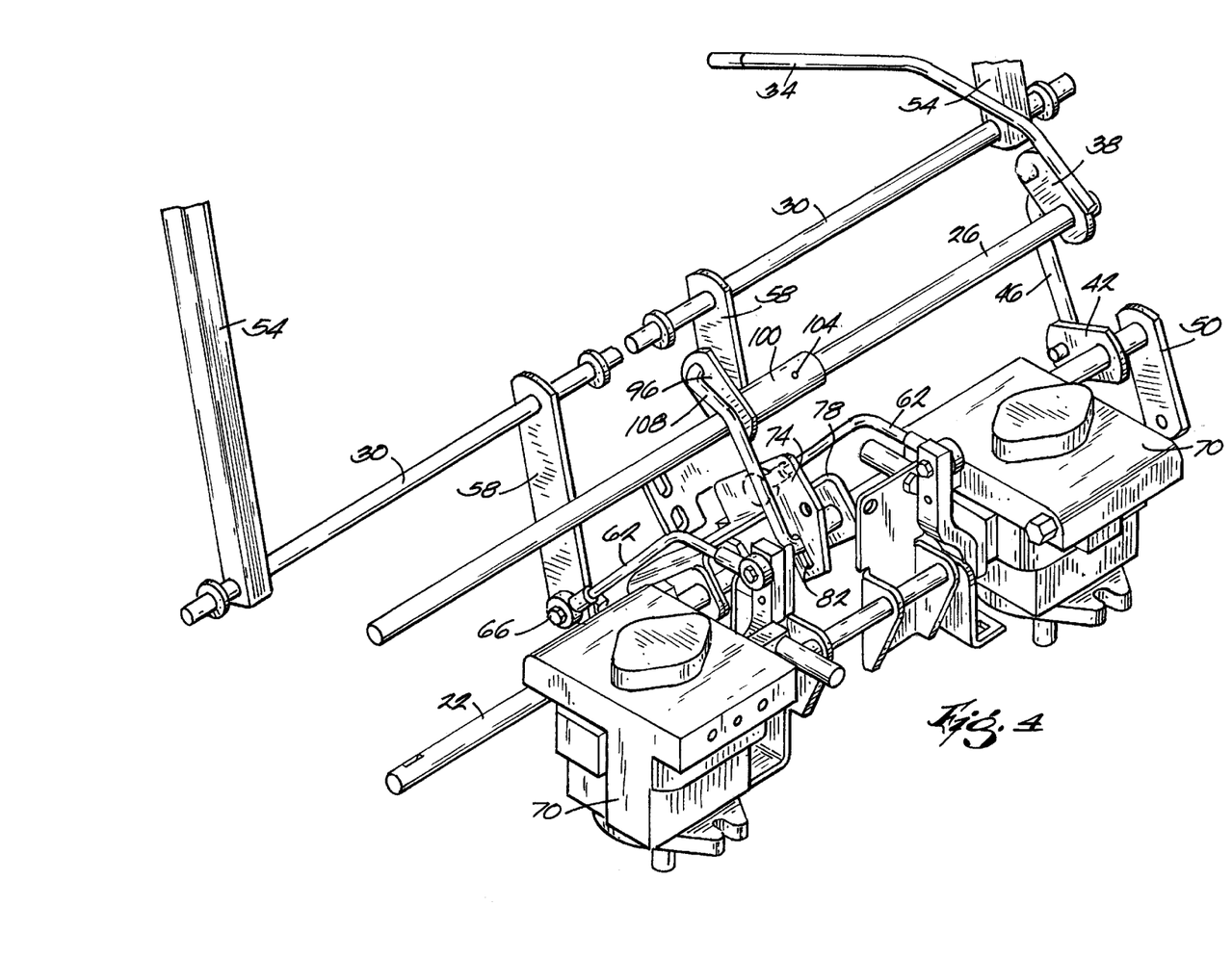
FIG. 4 is a rear left perspective view of the assembly with the parking brake disengaged.

FIG. 1 illustrates a portion of a riding lawnmower able to turn with a turn radius that is substantially zero (referred to herein as a "zero turn" lawnmower). The lawnmower includes a chassis 10 to which is mounted a conventional engine, rotary cutting blade for cutting grass, and wheels 14. The illustrated wheels 14 are drive wheels that are actuated to cause the lawnmower to move over land. Typically two additional wheels 14 (not shown) are provided that are not actuated. The wheels 14 have associated therewith parking brakes 18 that lock the wheels 14 when the parking brake system is engaged. The lawnmower may alternatively have a single parking brake 18 that operates on one of the wheels 14. Some of these aspects of the lawnmower are not illustrated because they are conventional and therefore well within the knowledge of one of skill in the art.

Mounted to the chassis 10 is a base support structure supporting for rotation a brake actuating shaft 22, an interlock shaft 26, and a pair of control lever shafts 30. A parking brake handle 34 is welded to a first offset link 38 that is welded or otherwise affixed to the interlock shaft 26. The parking brake handle 34 is movable between a disengaged position (FIGS. 6 and 8) and an engaged position (FIGS. 7 and 9), and rotates the interlock shaft 26 as the parking brake handle 34 is moved between those positions.

A second offset link 42 is welded or otherwise affixed to the brake actuating shaft 22, and is linked to the first offset link 38 with a brake link 46 such that rotation of the second offset link 42 with the brake actuating shaft 22 causes rotation of the first offset link 38 with the interlock shaft 26. A pair of third offset links 50 are welded or keyed to the ends of the brake actuating shaft 22 and actuate the parking brakes 18 through brake rods 52 in response to rotation of the brake actuating shaft 22. Thus, when the brake handle 34 is in the engaged position, the parking brakes 18 are engaged and substantially prevent the wheels 14 from rotating. Conversely, when the brake handle 34 is in the disengaged position, the parking brakes 18 are disengaged and do not resist rotation of the wheels 14.

A control lever 54 is connected to the end of each of the control lever shafts 30. A control link 58 is welded or otherwise affixed to the opposite ends of the control lever shafts 30. A control arm 62 is interconnected with the lower end of each control link 58 by way of a nut and bolt assembly. The bolt 66 extends through the control link 58 and provides a post on the inboard side of each control link 58. Each control arm 62 interconnects the associated control lever 54 with a conventional hydrostatic pump 70 that drives one of the lawnmower wheels 14. Each control lever 54 thus controls the direction and speed of rotation of a drive wheel 14 on the lawnmower.

Figure 6:
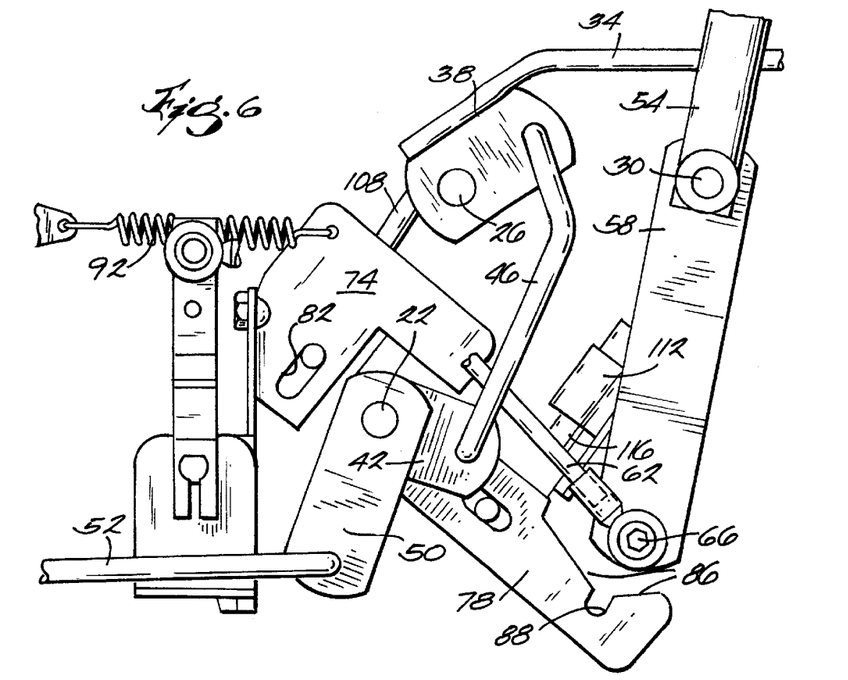
FIG. 6 is a right side elevation view of the assembly with the parking brake disengaged, and with selected elements removed for the purpose of illustration.
Figure 7:
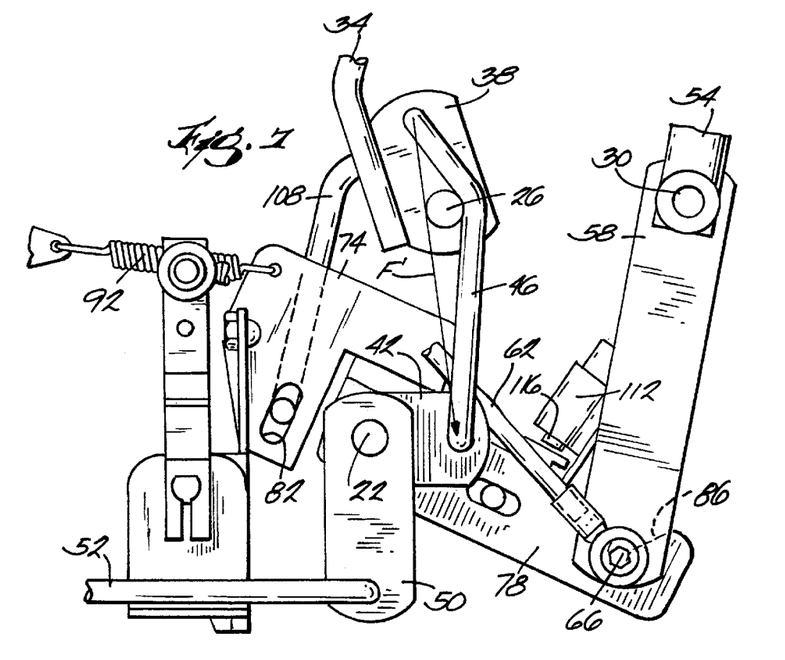
FIG. 7 is substantially the same view as FIG. 6 with the parking brake engaged.

The right control lever 54 is illustrated in a neutral position in FIGS. 6 and 7. The right control lever 54 may be used to rotate the associated control lever shaft 30 in a forward direction and reverse direction to cause forward and reverse rotation, respectively, of the associated drive wheel 14. The further the control lever 54 rotates the control lever shaft 30 in the respective directions, the greater the resulting speed of rotation of the associated drive wheel 14. Preferably, return springs (not shown) provide biasing forces on the control levers 54 to bias the control levers 54 toward the neutral position.

As seen in FIGS. 1–5, an interlock assembly includes a yoke 74 and a pair of interlock arms 78 bolted or welded to the yoke 74. The yoke 74 includes two basic structural members, a base body and a nose welded to the base body. The base body includes a bore through which the brake actuating shaft 22 extends, and the yoke 74 is therefore supported by the brake actuating shaft 22 for rotation with respect to the brake actuating shaft 22. The nose includes a slot 82. The interlock arms 78 include ramped surfaces or angled faces 86 and cupped or semi-circular cutout portions 88 that are adapted to receive the ends of the bolts 66. The yoke 74 and interlock arms 78 are rotatable between an interference position in which the bolts 66 are received in the cutout portions 88, and a non-interference position in which the bolts 66 are free from the cutout portions 88. A biasing member (e.g., the illustrated return spring 92) is connected to the nose and biases the yoke 74 and interlock arms 78 toward the interference position.

When in the interference position, the interlock arms 78 prevent rotation of the control levers 54 and control links 58 from their neutral positions, and when the interlock arms 78 are in the non-interference position, the control levers 54 and control links 58 are free to move from their neutral positions. The ramped surfaces 86 act as guide surfaces that guide the bolt ends to the cutout portions 88 as the interlock arms 78 are moved toward the interference position.

A fourth offset link 96 is welded to a sleeve 100, and the sleeve 100 is keyed to the interlock shaft 26. A roll pin 104 extends through the sleeve 100 and into the interlock shaft 26 to prevent the sleeve 100 from sliding on the interlock shaft 26. An end of an interlock link 108 is pivotably received in a hole in the fourth offset link 96, and the opposite end of the interlock link 108 is received in and slidable along the slot 82 in the yoke 74. It should be noted that the invention does not require a slot 82 having two closed ends. In fact, the slot 82 may be configured to have an open bottom end and a top end that may be closed or have an opening that is small enough to prevent the end of the interlock link 108 from sliding out of the top end. In this regard, the top end of the slot 82 may be referred to as "substantially closed." A reconfiguration of parts may also permit the bottom end of the slot 82 to be engaged by the interlock link 108, or may permit a slot 82 that is oriented in a different manner than illustrated, and these reconfigurations are within the scope of the invention.

Figure 5:
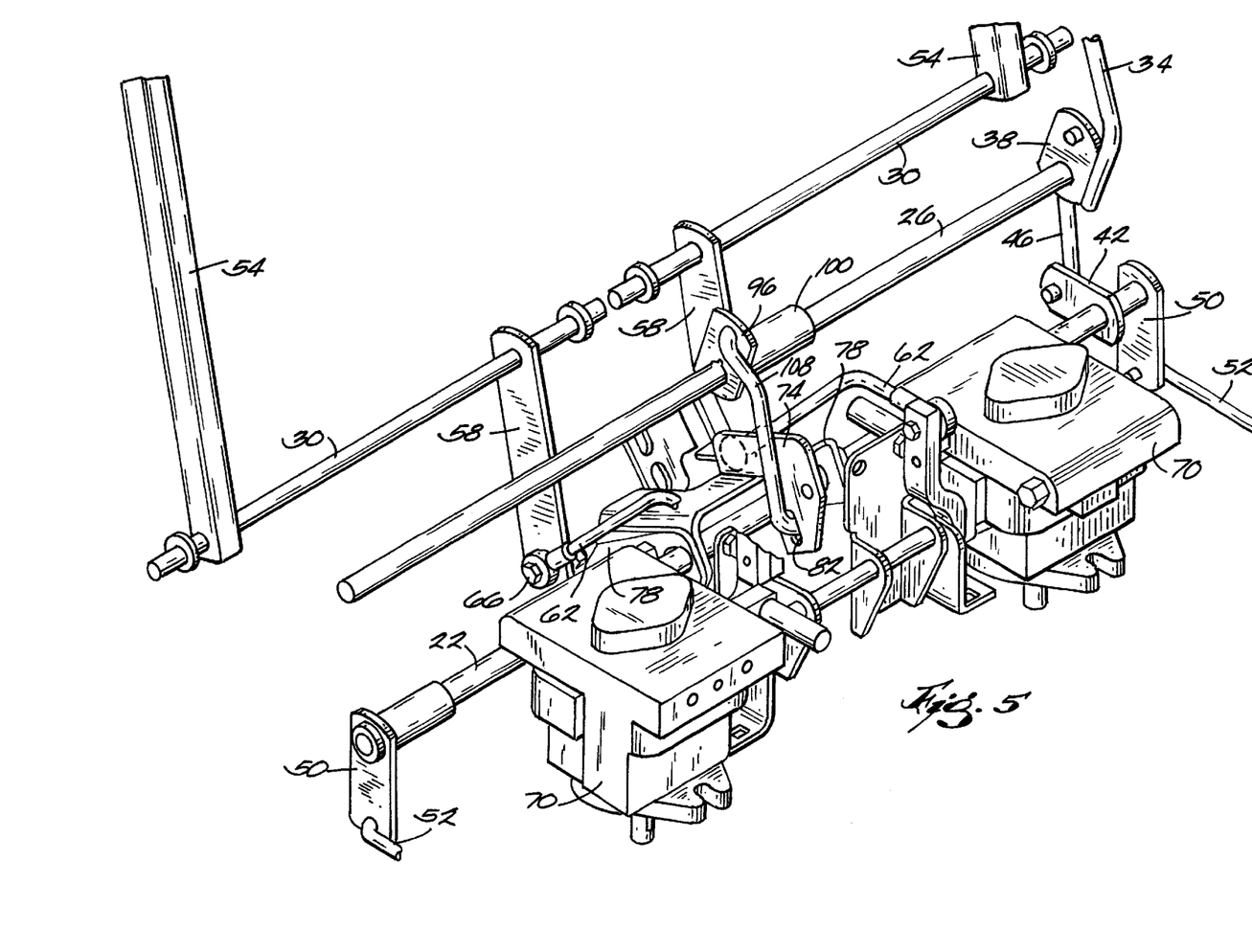
FIG. 5 is substantially the same view as FIG. 4 with the parking brake engaged.
Figure 8:
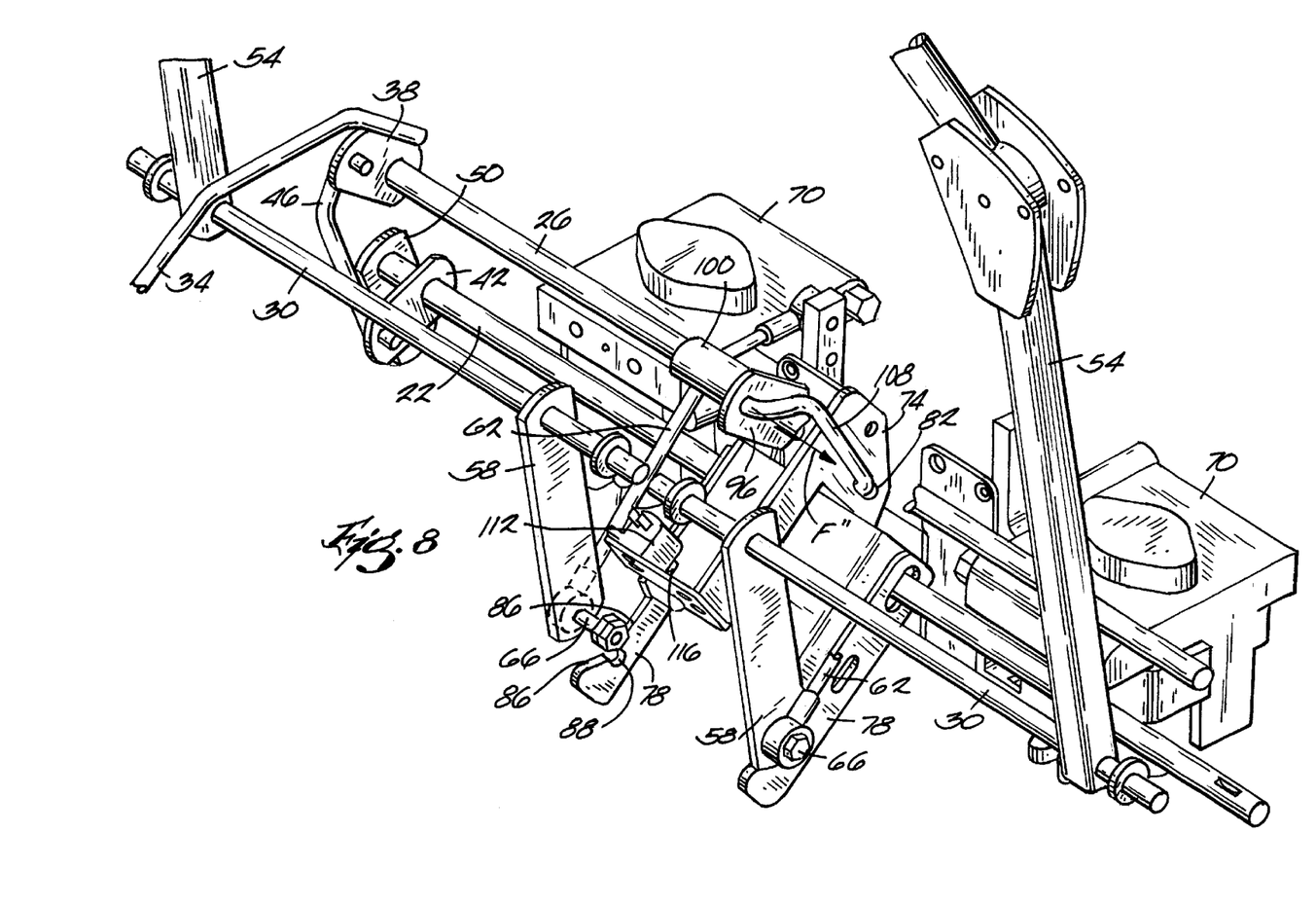
FIG. 8 is a left front perspective view of the assembly with the parking brake disengaged.
Figure 9:
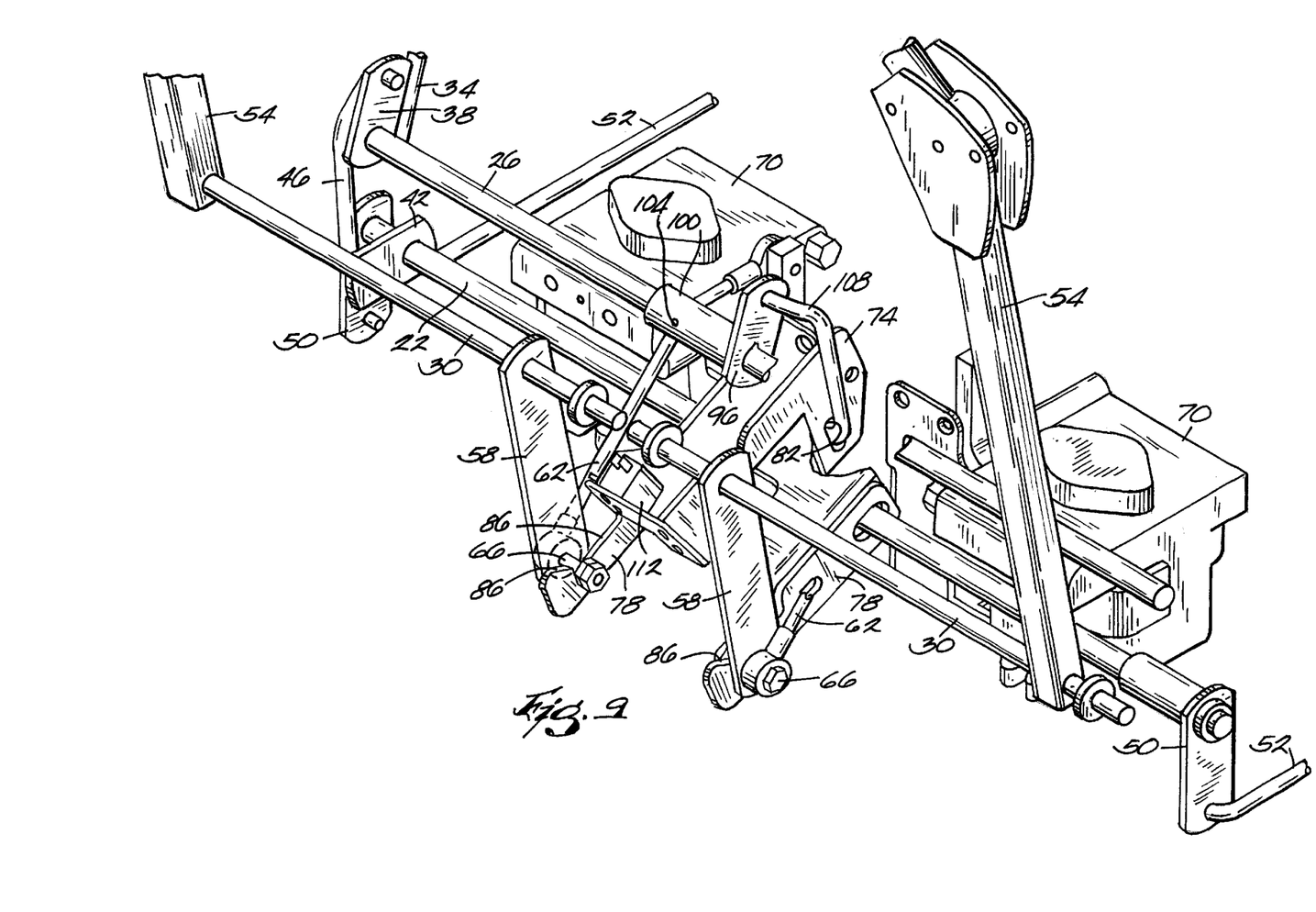
FIG. 9 is substantially the same view as FIG. 8 with the parking brake engaged.

As best seen in FIGS. 3, 4, 6, and 8, when the parking brake handle 34 is in the disengaged position, the interlock shaft 26 is rotated, causing the interlock link 108 to engage the top end of the slot 82 and rotate the yoke 74 and interlock arms 78 to the non-interference position against the biasing force of the biasing member 92. As seen in FIGS. 5, 7, and 9, when the parking brake handle 34 is in the engaged position, the end of the interlock link 108 is positioned within the slot 82 away from either end of the slot. The interlock assembly thus moves to the interference position under the influence of the biasing member 92, and not under the direct influence of the interlock link 108. This configuration protects the yoke 74, interlock arms 78, interlock link 108, and interlock shaft 26 from damage that may occur when the parking brake handle 34 is moved to the engaged position and one or both of the control levers 54 is not in its neutral position. The illustrated embodiment permits the biasing force of the biasing member 92 to urge the control levers 54 back to the neutral position as the bolts 66 are guided to the cutouts 88 by the ramped surfaces 86.

Referring to FIGS. 7, the geometry of parts creates an over-center feature that urges the parking brake handle 34 to remain in the respective engaged and disengaged positions. When the parking brake handle 34 is in the engaged position (FIG. 7), a line of force F' is created due to the tension in the brake rods 52. Because the brake link 46 is bent, the line of force F' is positioned to the left of the brake shaft 22 as seen in FIG. 7. This causes a moment force urging the first offset link 38 to rotate counterclockwise as illustrated, or toward the engaged position. Similarly, as seen in FIG. 8, a line of force F'" is created when the brake handle is in the disengaged position due to the spring 92. Because the interlock link 108 is bent, the line of force F" urges the interlock shaft 26 to rotate toward the disengaged position illustrated.

FIGS. 6–9 illustrate a brake sensor or interlock switch 1 12 that is interconnected with the starting circuitry of the engine. The interlock switch 112 includes a plunger 116 that is biased to extend out of a housing. When the parking brake handle 34 is in the engaged position, and once both control levers 54 have moved to the neutral position, the yoke 74 abuts the plunger 116 and pushes the plunger 116 into the housing. The plunger 116 closes the starting circuitry and permits electrical startup of the engine. When the parking brake handle 34 is in the disengaged position, the yoke 74 is moved away from the interlock switch 112, permitting the plunger 116 to move out of the housing and opening the circuitry, thereby preventing startup of the engine. In this regard, the interlock switch 112 acts as a sensor that determines both whether the parking brake handle 34 is in the engaged position and whether the control levers 54 are in the neutral position. Alternatively, the interlock switch 112 may be positioned to be actuated by one of the interlock arms 78.

In operation, the parking brake handle 34 must be set so that the interlock yoke 74 engages the interlock switch 112 to enable the mower start circuit. With the start circuit activated, the engine can be started. After startup, the engine remains operative independent of the start circuit. At this time, the engine is energized but the control levers 54 cannot be manipulated because the interlock assembly is in the interference position. Movement of the parking brake handle 34 to the disengaged position frees the control lever links 58 from the interlock arms 78, thereby freeing the control levers 54. After use, the parking brake handle 34 is moved to the engaged position by the operator. If the control levers 54 are not in the neutral positions, the bolts 66 ride down the ramped surfaces 86 and into the cutout portions 88 as the return springs bias the control levers 54 to the neutral position.

What is claimed is:

1. A riding lawnmower comprising:
    a chassis;
    first and second drive wheels at least partially supporting said chassis and rotatable to cause movement of said chassis;
    first and second drive systems associated with said first and second drive wheels, respectively;
    first and second control levers associated with and controlling said first and second drive systems, respectively, to control the direction and speed of rotation of said first and second drive wheels, respectively, each of said control levers having a neutral position in which the associated drive system does not cause rotation of the associated drive wheel;
    a parking brake operatively interconnected with said one of said wheels;
    a parking brake handle interconnected with said chassis and movable between an engaged position and a disengaged position to cause said parking brake to respectively resist and not resist rotation of said one wheel; and
    a linkage interconnecting said parking brake handle with said control levers, said linkage movable by said parking brake handle such that when said parking brake handle is in said disengaged position, said linkage is in a non-interference position in which said linkage permits movement of said control levers from said neutral positions, and when said parking brake handle is in said engaged position, said linkage is in an interference position in which said linkage resists movement of said control levers from said neutral positions.

2. The lawnmower of claim 1, further comprising a biasing member biasing said linkage toward said interference position.

3. The lawnmower of claim 1, wherein said linkage includes first and second interlock arms supported for rotation with respect to said chassis, said interlock arms being movable to hold said first and second control levers, respectively, in their respective neutral positions when said linkage is in said interference position, and to permit movement of said first and second control levers from their respective neutral positions when said linkage is in said non-interference position.

4. The lawnmower of claim 3, further comprising:
    a yoke mounted to said chassis for rotation with respect to said chassis, said interlock arms being fixed for rotation with said yoke; and
    a biasing member interconnected with said yoke to bias said interlock arms toward said interference positions.

5. The lawnmower of claim 4, wherein said yoke includes a slot having at least one substantially closed end, said linkage further including a finger extending into and movable along said slot, said finger abutting said closed end of said slot and moving said interlock arms to said non-interference position against the biasing force of said biasing member in response to said parking brake handle being moved toward said engaged position, said finger disengaging said closed end of said slot in response to said parking brake handle being moved toward said disengaged position.

6. The lawnmower of claim 3, wherein each of said interlock arms includes a ramped guide surface to guide said control levers to their respective neutral positions.

7. The lawnmower of claim 1, further comprising an over-center mechanism urging said parking brake handle toward said engaged position when said parking brake is in said engaged position, and toward said disengaged position when said parking brake handle is in said disengaged position.

8. A riding lawnmower comprising:
    a chassis;
    first and second drive wheels at least partially supporting said chassis and rotatable to cause movement of said chassis;
    first and second drive systems associated with said first and second drive wheels, respectively;
    first and second control levers associated with and controlling said first and second drive systems, respectively, to control the direction and speed of rotation of said first and second drive wheels, respectively, each of said control levers having a neutral position in which the associated drive system does not cause rotation of the associated drive wheel; and
    first and second interlock arms supported for rotation with respect to said chassis and movable between an interference position in which said first and second interlock arms hold said first and second control levers, respectively, in their respective neutral positions, and a non-interference position in which said first and second interlock arms permit movement of said first and second control levers from their respective neutral positions, each of said interlock arms including a ramped guide surface to guide said control levers to their respective neutral positions.

9. The lawnmower of claim 8, further comprising a biasing member biasing said interlock arms toward said interference positions.

10. The lawnmower of claim 8, further comprising:
    a yoke mounted to said chassis for rotation with respect to said chassis, said interlock arms being fixed for rotation with said yoke; and
    a biasing member interconnected with said yoke to bias said interlock arms toward said interference positions.

11. The lawnmower of claim 10, wherein said yoke includes a slot having at least one substantially closed end, said lawnmower further comprising:
    a parking brake operatively interconnected with said one of said wheels;
    a parking brake handle interconnected with said chassis and movable between an engaged position and a disengaged position to cause said parking brake to respectively resist and not resist rotation of said wheel; and
    a finger extending into and movable along said slot, said finger abutting said closed end of said slot and moving said interlock arms to said non-interference position against the biasing force of said biasing member in response to said parking brake handle being moved toward said engaged position, said finger disengaging said closed end of said slot in response to said parking brake handle being moved toward said disengaged position.

12. The lawnmower of claim 8, further comprising:

a parking brake handle interconnected with said chassis and movable between an engaged position in which said locking arms are permitted to move toward said interference positions, and a disengaged position in which said locking arms are moved to said non-interference positions; and an over-center mechanism urging said parking brake handle toward said engaged position when said parking brake handle is in said engaged position, and toward said disengaged position when said parking brake handle is in said disengaged position.

13. A riding lawnmower comprising:

a chassis;

an engine mounted to said chassis;

a rotary cutting blade selectively rotated by said engine;

first and second drive wheels at least partially supporting said chassis and rotatable to cause movement of said chassis;

first and second drive systems associated with said first and second drive wheels, respectively;

first and second control levers associated with and controlling said first and second drive systems, respectively, to control the direction and speed of rotation of said first and second drive wheels, respectively, each of said control levers having a neutral position in which the associated drive system does not cause rotation of the associated drive wheel;

a parking brake operatively interconnected with said one of said wheels;

a parking brake handle interconnected with said chassis and movable between an engaged position and a disengaged position to cause said parking brake to respectively resist and not resist rotation of said one wheel;

a brake sensor determining when said parking brake handle is in the engaged position; and a starting device for starting said engine, said brake sensor preventing said starting device from starting said engine when said parking brake handle is not in said engaged position, said starting device not using sensors separate from said brake sensor to determine whether said control levers are in said neutral positions.

14. The lawnmower of claim 13, wherein said brake sensor includes a switch.

15. The lawnmower of claim 13, wherein said brake sensor includes a plunger depressed by a linkage in response to movement of said parking brake handle toward said engaged position.

* * * * *